(12) United States Patent
Barenbrug et al.

(10) Patent No.: US 9,036,006 B2
(45) Date of Patent: May 19, 2015

(54) METHOD AND SYSTEM FOR PROCESSING AN INPUT THREE DIMENSIONAL VIDEO SIGNAL

(75) Inventors: Bart G. B. Barenbrug, Eindhoven (NL); Gerardus W. T. Van Der Heijden, Eindhoven (DE); Peter J. L. A. Swillens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 614 days.

(21) Appl. No.: 13/125,372

(22) PCT Filed: Oct. 16, 2009

(86) PCT No.: PCT/IB2009/054564
§ 371 (c)(1),
(2), (4) Date: Apr. 21, 2011

(87) PCT Pub. No.: WO2010/046824
PCT Pub. Date: Apr. 29, 2010

(65) Prior Publication Data
US 2011/0199459 A1 Aug. 18, 2011

(30) Foreign Application Priority Data

Oct. 21, 2008 (EP) ..................... 08167112

(51) Int. Cl.
*H04N 13/00* (2006.01)
*H04N 15/00* (2006.01)

(52) U.S. Cl.
CPC ......... *H04N 13/007* (2013.01); *H04N 13/0018* (2013.01); *H04N 13/0022* (2013.01)

(58) Field of Classification Search
CPC ............ H04N 13/007; H04N 13/0022; H04N 13/004; H04N 21/4884; G06F 3/0482; G06F 2203/04802
USPC ...................................... 348/43, 47
See application file for complete search history.

(56) References Cited

U.S. PATENT DOCUMENTS

| 7,417,664 | B2 * | 8/2008 | Tomita ........................... 348/43 |
| 2008/0240549 | A1 * | 10/2008 | Koo et al. ..................... 382/154 |
| 2008/0278573 | A1 * | 11/2008 | Ropinski et al. ................ 348/51 |

FOREIGN PATENT DOCUMENTS

| EP | 1089573 A2 | 4/2001 |
| EP | 1489857 A1 | 12/2004 |

(Continued)

OTHER PUBLICATIONS

Graham Jones et al., "Controlling Perceived Depth in Stereoscopic Images", Database Compendex [Online] Engineering Information, Inc., New York, NY, US; Apr. 21, 1997, vol. 4297, 2001, pp. 42-53, XP002516923.
Janusz Konrad et al., "Dense Disparity Estimation from Feature Correspondences", IS&T/SPIE Symposium on Electronic Imaging Stereoscopic Displays and Virtual Reality Systems., Jan. 23-28, 2000, San Jose, CA, USA.

(Continued)

*Primary Examiner* — Andy Rao
*Assistant Examiner* — Jared Walker
(74) *Attorney, Agent, or Firm* — Larry Liberchuk

(57) ABSTRACT

The invention relates to a system and method of processing an input three dimensional video signal comprising multiple views, the method comprising: determining a far disparity estimate indicative of the largest disparity value for the input three dimensional video signal, a near disparity estimate indicative of the smallest disparity value for a spatial region within the input three dimensional video signal, adapting the input three dimensional video signal by shifting the input three dimensional video signal backwards by means of a disparity shift based on the far disparity estimate and generating an overlay within the spatial region for the shifted three dimensional video signal based on the near disparity estimate and the disparity shift. The invention further relates to a computer program product implementing a method according to the present invention.

14 Claims, 5 Drawing Sheets

(56) References Cited

FOREIGN PATENT DOCUMENTS

| GB | 2354389 A | 3/2001 | |
| WO | WO2005060271 A1 | 6/2005 | |
| WO | WO 2005060271 A1 * | 6/2005 | ............ H04N 13/02 |
| WO | WO 2006111893 A1 * | 10/2006 | |
| WO | WO2006111893 A1 | 10/2006 | |
| WO | WO2008115222 A1 | 9/2008 | |
| WO | WO 2008115222 A1 * | 9/2008 | ............ H04N 13/00 |

OTHER PUBLICATIONS

B.L. Yeo et al., "Rapid Scene Analysis on Compressed Videos", IEEE Trans. Circuits and Systems for Video Technology, vol. 5, pp. 533-544, Dec. 1995.

Manbae Kim et al., "Depth Scaling of Multiview Images for Automultiscopic 3D Monitors", 1Dept. of Computer and Communications Engineering, Kangwon National University, Chunchon, Korea, Multiview Image Shift, p. 183, sec. 2.5.

* cited by examiner

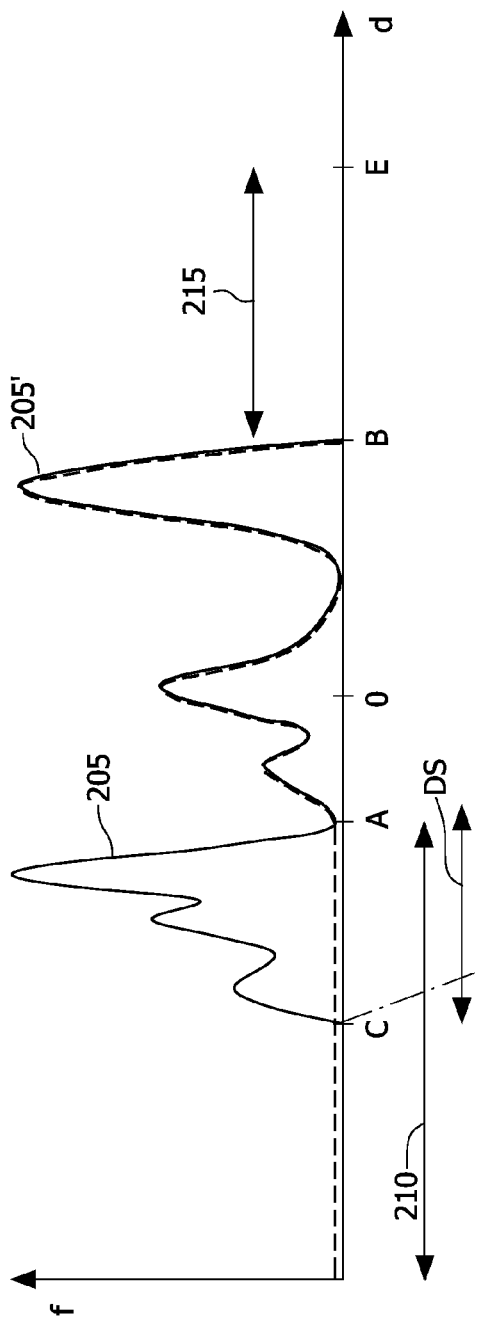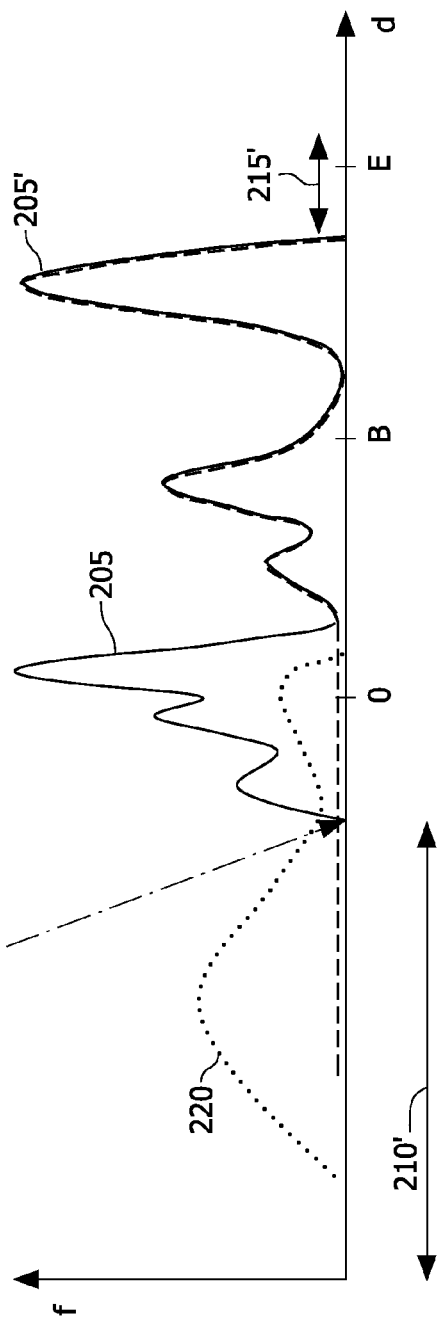

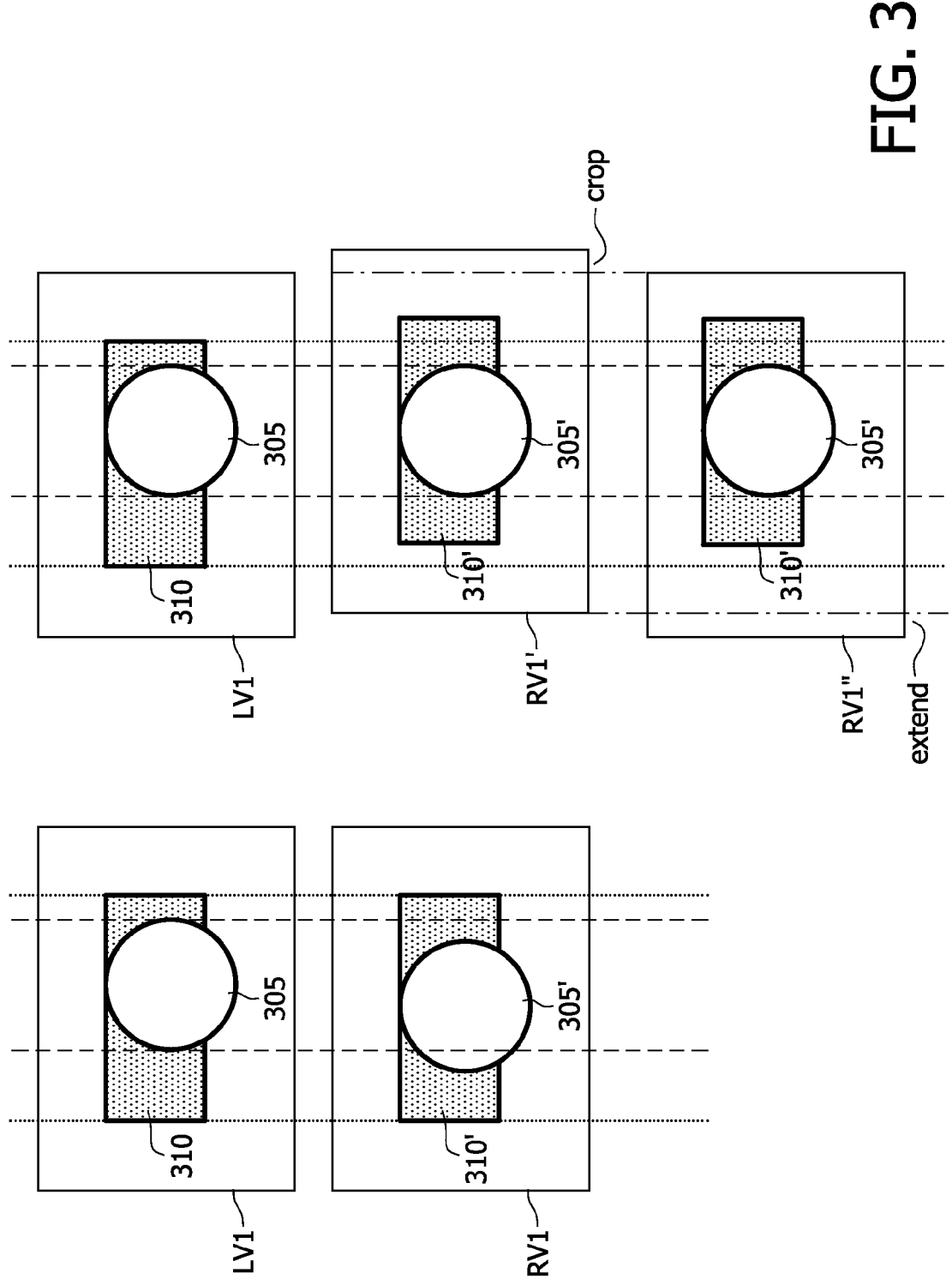

METHOD AND SYSTEM FOR PROCESSING AN INPUT THREE DIMENSIONAL VIDEO SIGNAL

FIELD OF THE INVENTION

The invention relates to a method and a system for processing an input three dimensional video signal as well as to a computer program product for implementing the method according to the invention.

BACKGROUND OF THE INVENTION

Display devices suitable for displaying three-dimensional images are receiving an increasing interest in research. In addition substantial research is undertaken in order to establish how to provide end-users with a satisfying, high quality viewing experience.

Three dimensional (3D) displays add a third dimension to the viewing experience by providing both eyes of a viewer with different views of the scene being watched. This can be achieved by having the user wear glasses to separate two views that are displayed. However, as glasses may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

Various different approaches exist for providing content to such stereoscopic and autostereoscopic devices. A popular format is the delivery of stereo content or multi-view content that effectively comprising multiple images for respective views that can be displayed by the display device. The advantage of doing so is that generally processing requirements in such a display device and in content creation can be kept to a minimum.

A problem associated with the delivery of stereo or multi-view content comprising actual encoded views for display is that these images effectively fix the disparity relationship between the two or more respective views in an implicit manner.

SUMMARY OF THE INVENTION

It is a goal of the present invention to mitigate the disadvantages of having encoded the disparity relationship in stereo or multiview content for three dimensional displays when applying overlays.

This goal is achieved by a method of processing an input three dimensional video signal according to the present invention wherein the method comprises: determining a far disparity estimate indicative of the largest disparity value for the input three dimensional video signal and a near disparity estimate indicative of the smallest disparity value for a spatial region within the input three dimensional video signal, adapting the three dimensional video signal by shifting the input three dimensional video signal backwards by means of a disparity shift based on the far disparity estimate and generating an overlay within the spatial region for the shifted three dimensional video signal based on the near disparity estimate and the disparity shift. By making some of the disparity information (the far and near values) explicit (as opposed to the implicit information in the multi-view image data), explicit processing such as determining the amount of shift is made possible.

The inventors of the present invention realized that by establishing a far and near disparity estimate as indicated above, the available headroom for the overlay can be established, in order to allow safe positioning of an overlay in front of the scene depicted in the video signal. The far and near disparity estimate may be determined for example by using coarse grain disparity analysis of the input three dimensional video signal or alternatively, by using meta-data provided in the input three dimensional video signal.

Once it is clear whether and how much the three dimensional input video signal can be adapted, its disparity range can be shifted backwards by means of a disparity shift based on the far disparity estimate. A disparity shift does not require re-rendering of the content but can be implemented in a relatively cost efficient manner typically by cropping and extending views.

As a result the disparity range available for generating an overlay can be extended, allowing, e.g. an overlay to be placed closer to the zero disparity plane of a display, so as to obtain a sharper overlay. It will be clear to the skilled person that the latter is subject to the available headroom in the input three dimensional video signal.

In an embodiment the far and near disparity estimates are based on a disparity estimate of the input three dimensional video signal. In particular when a margin is preserved in the adaptation of the disparity range, a coarse disparity estimate may be conducted. Should the sparse disparity estimate be not fully correct, the margin may still compensate such errors.

In an alternate embodiment the far and near disparity estimates are be derived from information provided as metadata within the input three dimensional video signal. As a result present invention can be implemented in a highly cost effective manner.

In a preferred embodiment according to the present invention the method further comprises overlaying the shifted three dimensional video signal with the generated overlay, thereby enabling generation of images for use on a multi-view display comprising overlays such as e.g. subtitles, closed caption information, user interface information and/or image sequences. These overlays themselves may be either still images or animated sequences of two or three-dimensional image data which are subsequently encoded using appropriate disparity values based on the near disparity estimate and the disparity shift applied.

In case of a three-dimensional overlay it may be necessary to shift the disparity range of the overlay in such a manner that it can be placed within the available disparity range. When the overlay is generated using computer graphics, there is full control of the placement of the graphics, and the entire available disparity range available for the overlay in the shifted three dimensional video signal may be utilized.

In a preferred embodiment the disparity value estimates are determined on a per shot basis. In order to determine shot boundaries, also known as shot cuts. Conventional shot cut detection techniques may be applied to one or more views of the view in the input three dimensional video signal. An example of such a technique is presented in "Rapid Scene Analysis on Compressed Videos", by B. L. Yeo and B. Liu, published in IEEE Trans. Circuits and Systems for Video Technology, Vol. 5, pp. 533-544, December 1995. Although the shot boundaries may be determined in real-time, generally the determination for use with the present invention would require a substantial look-ahead. As a result shot cut detection is preferably done off-line.

In case the overlay is to be present in several consecutive shots, for example in a Picture In Picture scenario the far and near disparity estimates are preferably determined based on the content of these consecutive shots, so as to allow proper overlaying of the overlay.

In an advantageous embodiment the disparity shift is based on a predetermined maximum disparity value between adjacent views of the multiple views. Throughout this application positive disparity is used to indicate objects that are perceived as being located behind the zero disparity plane. As a result a predetermined maximum is considered here.

A positive disparity larger than eye distance corresponds to divergent eye lines, which are not physically interpretable. As a result positive disparity larger than eye distance may cause viewing discomfort. To avoid this it is possible to set the maximum disparity to an average eye distance, or to a value below the average distance. Preferably the maximum disparity is selected such that a safety margin is taken into account so as to maintain comfort for all viewers. Alternatively the maximum disparity may be a user defined value optionally upper bounded by the average eye distance. The latter is particularly advantageous as it allows for compensation in differences in eye distance between e.g. adults or children.

The overlay information may range from subtitles or closed caption information as encoded e.g. on optical discs and/or available in digital transport streams. The overlay information may also relate to a graphical user interface data (GUI) which is superimposed onto the input three dimensional video signal. More alternatively the overlay can be a Picture in Picture system (PiP) or other subpicture comprising animated content, such as an animated thumbnail in a GUI or an animated TV station logo.

In an embodiment the adapting of the input three dimensional video signal comprises cropping one or more views of the input three dimensional video signal on a first side of the view. Subsequently the cropped view may be extended so as to obtain a full size view by padding or interpolated pixels on a side opposite to the first side of the view, so as to obtain an altered disparity range for the cropped views. Alternatively zooming may be used to scale the remainder to full width again. In this scenario the zoom factor will also have to be applied to the other view(s).

In case of a stereo input video signal the method may comprise cropping a single image, however, preferably, both images are cropped, so as to distribute possible artifacts resulting from extending the cropped image. It will be clear to the skilled person that extending the cropped image may involve a variety of algorithms ranging from simple pixel repetition schemes, to more complex imprinting schemes known from the field of still/motion image restoration.

In an embodiment the method further comprises embedding metadata in the shifted three dimensional video signal, the data being indicative of the far and near disparity of the shifted three dimensional video signal. Alternatively when the method also comprises overlaying the shifted three dimensional video signal the method comprises embedding metadata in the shifted three dimensional video signal comprising the overlay, the data being indicative of the far and near disparity of the shifted three dimensional video signal comprising the overlay. As a result the metadata may be used for further downstream processing steps.

The present invention further relates to a computer program product, comprising program instructions for executing the method of the invention.

The present invention further relates to a system for processing an input three dimensional video signal comprising multiple views, the system comprising: a disparity determinator for determining a far disparity estimate indicative of the largest disparity value for the input three dimensional video signal and a near disparity estimate indicative of the smallest disparity value for a spatial region within the input three dimensional video signal, a disparity shifter arranged for adapting the three dimensional video signal by shifting the three dimensional video signal backwards by means of a disparity shift based on the far disparity estimate, and an overlay generator arranged to generate an overlay within an overlay safe area for the shifted three dimensional video signal based on the near disparity estimate and the disparity shift.

Preferably also a video mixer is provided to overlay the overlay over the shifted three dimensional video signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, wherein like numerals refer to element with like function, in which FIG. 2A, illustrates a disparity histogram of a three dimensional input signal, FIG. 2B, illustrates a further disparity histogram of a three dimensional input signal and a three dimensional overlay, FIG. 3, illustrates the adaptation of a right view image of a stereo input pair in accordance with the present invention.

DETAILED DESCRIPTION OF THE INVENTION

Figure 1:
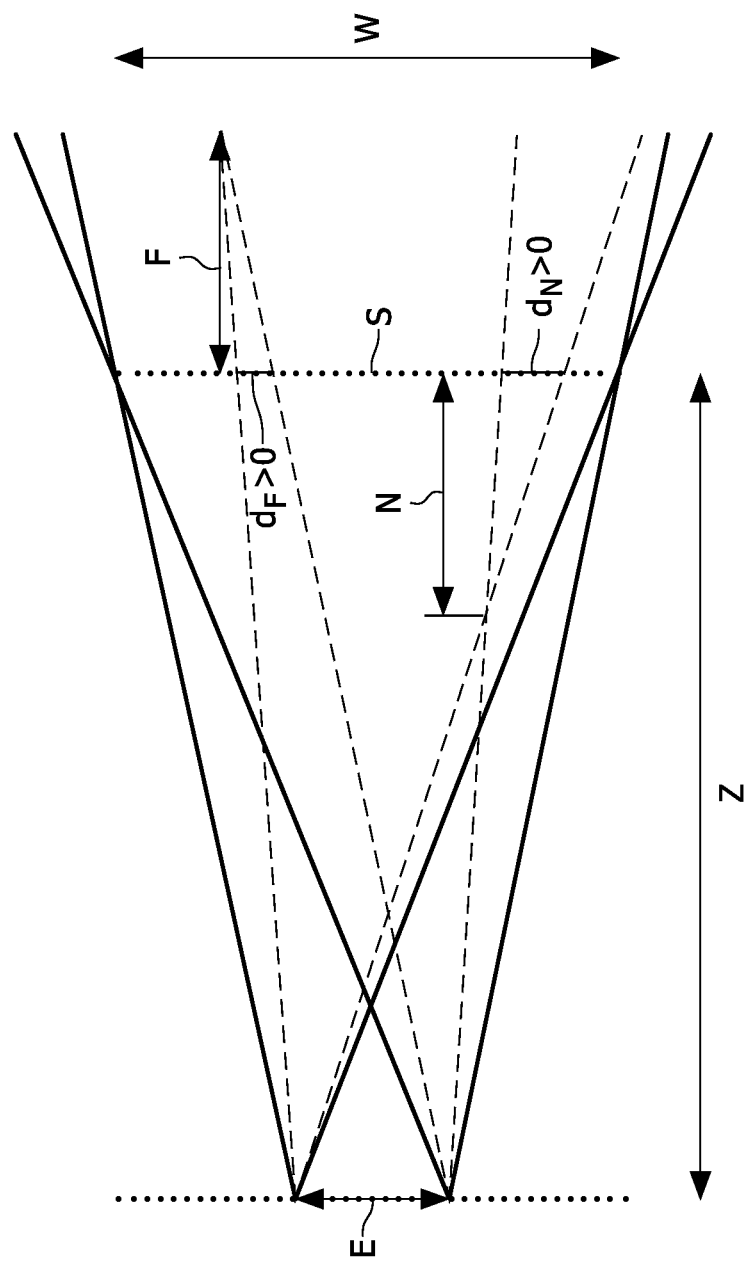
FIG. 1, illustrates several general concepts and parameters defining disparity.

FIG. 1 illustrates several general concepts and parameters defining disparity. FIG. 1 shows two viewpoints located at the edges of the double arrow E, spaced apart by eye-distance E. At a viewing distance Z, a screen S, represented by a dotted line, is located which is used for displaying three dimensional information. Such a screen in practice may be e.g. a time or spectrum sequential display that alternatively provides an eye of an observer wearing appropriate eye-wear with appropriate image information for the respective view point. The screen S here is placed at zero disparity, and W indicates the width of the screen. N (near) represents the maximum perceived depth in front of the screen S. Likewise F (far) represents the maximum perceived depth behind the screen S.

The line $d_N$ represents the perceived disparity of an object located at N in front of the screen S, the disparity value $d_N$ here is negative, also referred to as crossed disparity and can be expressed as:

$$d_N = NE/(Z-N) \qquad [1]$$

The line $d_F$ represents the perceived disparity of an object located at F behind the screen S, the disparity value $d_F$ here is positive, also referred to as un-crossed disparity, and can be expressed as:

$$d_F = FE/(Z+F) \qquad [2]$$

In practice the maximum disparity should be below the eye distance E to allow comfortable viewing. In practice the maximum disparity is preferably set to a value below the average eye distance E to allow for variation in eye distance between people.

It is noted that the maximum positive screen parallax, that is the number of pixels corresponding to the maximum positive disparity depends on the screen width W and resolution of the screen S.

FIG. 2A illustrates a disparity histogram 205 of a three dimensional input signal. The histogram 205 is determined based on the input three dimensional signal, i.e. on the entire spatial area of the three dimensional input signal. Alternatively a disparity histogram may be compiled for representative samples of the entire spatial area of the three dimensional input signal.

In FIG. 2A the nearest disparity value along the d-axis is point C, having a negative disparity. The farthest disparity value is point B along the d-axis having a positive disparity. Based on the histogram 205 the far disparity estimate for use in a method in accordance with the present invention corresponds to point B.

The histogram 205 indicates that there is headroom 215 available within the disparity range to shift the disparity range of the input three dimensional away from the viewer that is moving the histogram to the right.

Consider the situation wherein an overlay needs to be placed within a particular spatial region in the respective views. FIG. 2A also shows a disparity histogram for the input three dimensional signal in the relevant spatial region. The histogram of the three dimensional input signal for the spatial region is indicated by the thick broken line 205'. Based on the histogram 205' the near disparity estimate indicative of the smallest disparity value for this spatial region corresponds to point A. Note that as this particular spatial region does not comprise smaller (i.e. more negative) disparity values, there is already substantial headroom 210 in the spatial region for placement of an overlay.

Note that the spatial region for placement of an overlay is typically a block or segment defined by an outline, and as such is clearly different from sample points that are used to determine a disparity estimate for the view in its entirety as described hereinabove.

Although there is already substantial headroom in the spatial region for placement of an overlay, it is possible to create even more headroom by shifting the disparity range of the input three dimensional video signal away from the viewer by a disparity shift DS, wherein DS<E–B. Although not strictly necessary, it is advisable to preserve a margin (E–B)–DS as indicated in FIG. 2B by margin 215' for accommodating different eye-distances between various users. As a result the present invention provides an additional gain in the disparity range for placement of the overlay.

The histogram 220 indicates the disparity histogram of the overlay, as the overlay is placed entirely within this spatial region this histogram also is the histogram of the overlay over the entire image. As a result of the disparity shift, it is now possible to place overlay information such as subtitles at or near the zero disparity plane which improves overlay viewing comfort.

As indicated above the far and near disparity estimate may be determined based on disparity histogram information provided with the input three dimensional video signal. Alternatively the far and near disparity estimate may be derived from the input three dimensional video signal using algorithms known to those skilled in the art. An example of such an algorithm is presented in "Dense disparity estimation from feature correspondences" by Konrad, et al, IS&T/SPIE Symposium on Electronic Imaging Stereoscopic Displays and Virtual Reality Syst., Jan. 23-28, 2000, San Jose, Calif., USA.

FIG. 3 illustrates the process of shifting the disparity as proposed by the present invention. On the left hand side are shown an image pair LV1 and RV1 from a stereo input video signal. The images show a gray block 310 and 310' placed at zero disparity and a white disc 305 and 305' placed in front of the block at negative disparity in respectively the images LV1 and RV1.

As can be seen from the finely dashed vertical lines at the edges of the gray block 310 and 310', the rectangle has zero disparity because it is placed at the same position in the left and right image.

The disc 305 and 305' has a negative screen parallax, i.e. in the right image RV1 the disc 305' is to the left of the position of the disc 305 in the left image LV1. As a result it is visualized in front of the display.

In order to shift the scene backwards we shift RV1 to the right to obtain RV1'. Comparing RV1' to LV1 we now see that the disc 305' has zero disparity and the rectangle has positive disparity.

In order to fit the shifted image to a stereo display the shifted image RV1' is cropped on the right hand side and extended by an equal amount on the left hand side to arrive at RV1". LV 1 and RV1" in turn can be visualized together as a new stereo pair in which the scene has been shifted to the back compared to the original LV1-RV1 pair. As a result the pair LV1-RV1" has more headroom for placement of an overlay than the pair LV1-RV1.

It should be noted that although in the above example only one of the views is shifted, it is also possible to shift both the left image LV1 and the right image RV1 by an equal opposing amount, wherein the combined amount corresponds to the shift of RV1'. As a result both shifted images will have to be extended, but the extension region is half the size of that cropped and extended in FIG. 3. As a result artifacts resulting from the extending may be spread more evenly.

When shifting multi-view content, e.g. three views, it is possible to preserve the center image and to shift and extend the left and right image respectively. It will be clear to the skilled person that the above manner of shifting of the disparity range can subsequently be extended to further multi-view images and to any appropriate amounts of shift of the images resulting in the same relative amount of shift between them.

When adapting the input three dimensional video signal several options are available, for example, a first option is to use cropping only. Consider a stereo video signal, in this case it is possible to crop both the left and right images in the video signal by an equal amount. In case the image aspect ratio is not an issue the cropped views do not require extension and could be used as is. The advantage of doing so is that as no extension is needed, no extension artifacts are introduced. A second option is to use cropping and extension as described hereinabove. Consider a stereo video signal, in this case it is possible to crop both the left and right images in the video signal by an equal amount and subsequently extend the respective views as presented in FIG. 3. The advantage of using extension is that the aspect ratio of the input three dimensional video signal may be preserved. It is noted that the above list of options is not exhaustive.

Figure 4:
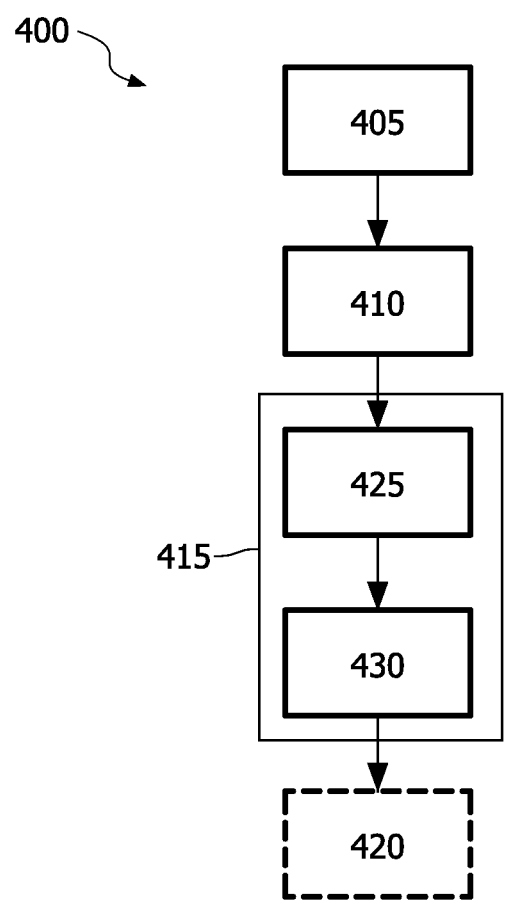
FIG. 4, illustrates a method according to the present invention.

FIG. 4 presents a flowchart of a method 400 according to the present invention for processing an input three dimensional video signal comprising multiple views. The method comprises a step for determining 405 a far disparity estimate indicative of the largest disparity value for the input three dimensional video signal and a near disparity estimate indicative of the smallest disparity value for a spatial region within the input three dimensional video signal. As indicated above the respective disparity estimates may be based on metadata or can alternatively determined based on the image content of the input three dimensional video signal.

The method further comprises a step of adapting 410 the three dimensional video signal by shifting the input three dimensional video signal backwards by means of a disparity shift based on the far disparity estimate and generating 415 an overlay within the spatial region for the shifted three dimensional video signal based on the near disparity estimate and the disparity shift.

Preferably the method further comprises a step of overlaying 420 the overlay over the shifted three dimensional video signal.

As indicated hereinabove the step of adapting the input three dimensional video signal may comprise a step for cropping 425 and extending 430 the respective views with padding pixels so as to obtain an altered disparity range.

In case of a stereo signal, one or preferably both views are cropped and subsequently extended. For an N-view multiview image, with N even, N-1 or preferably N-views are cropped and extended as described hereinabove.

Figure 5A:
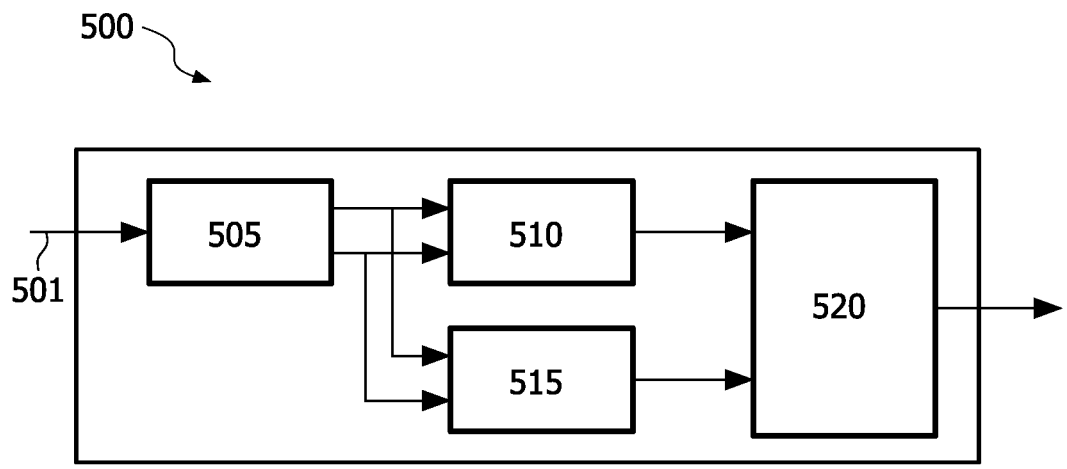
FIG. 5A, illustrates a system according to the present invention

FIG. 5A presents a system 500 according to the present invention for processing an input three dimensional video signal comprising multiple views. The system 500 comprises a disparity determinator 505 for determining a far disparity estimate indicative of the largest disparity value for the input three dimensional video signal and a near disparity estimate indicative of the smallest disparity value for a spatial region within the input three dimensional video signal. As indicated hereinabove, the disparity determinator 505 may be implemented as a disparity estimator. The system further comprises a disparity shifter 510 arranged for adapting the three dimensional video signal by shifting the three dimensional video signal backwards by means of a disparity shift based on the far disparity estimate. The system 500 further comprises an overlay generator 515 arranged to generate an overlay within an overlay safe area for the shifted three dimensional video signal based on the near disparity estimate and the disparity shift.

Preferably the system 500 also comprises a video mixer 520 arranged to overlay the overlay over the shifted three dimensional video signal. The system 500 as shown in FIG. 5A may be implemented on a Personal Computer or other computing platform for off-line processing of content. Alternatively it may be implemented in e.g. a Blu-ray disc playback capable device, or a Set Top Box or a 3D-TV.

Figure 5B:
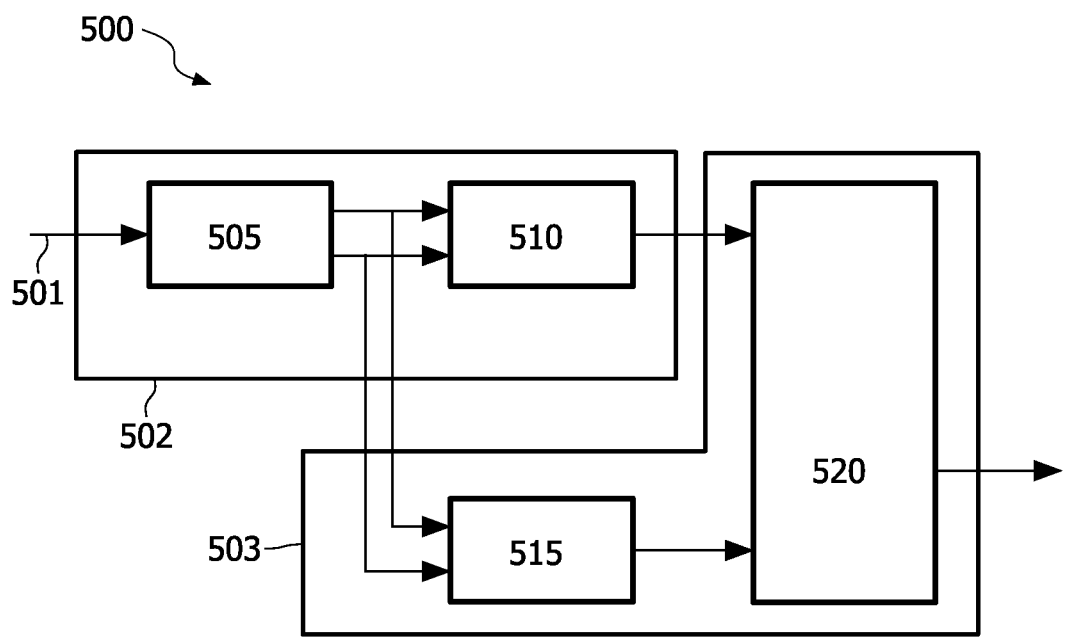
FIG. 5B, illustrates a further system according to the present invention.

FIG. 5B shows a further system 500 according to the present invention wherein the system is partitioned in an analysis device 502 and a compositing device 503, both devices combined implement the functionality found in the system 500 as presented in FIG. 5A.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of processing an input three dimensional video signal comprising multiple views, the method comprising:
   determining
      a far disparity estimate indicative of the largest disparity value for the input three dimensional video signal,
      a near disparity estimate indicative of the smallest disparity value for a spatial region within the input three dimensional video signal,
   adapting the input three dimensional video signal by shifting a disparity range of the input three dimensional video signal backwards away from the viewer by means of a disparity shift based on the far disparity estimate in order to produce an overlay safe area that is located substantially in front of scene content in the spatial region of the input three dimensional video signal, and
   generating an overlay in said overlay safe area within the spatial region for the shifted three dimensional video signal based on the near disparity estimate and the disparity shift, wherein said overlay safe area includes positions at or near a zero disparity plane of the input three dimensional video signal as displayed.

2. The method of claim 1 further comprising overlaying the overlay over the shifted three dimensional video signal.

3. The method of claim 1, wherein the far disparity estimate and the near disparity estimate both are one of shot basis and group of shots basis.

4. The method of claim 1, wherein the disparity shift is based on a predetermined maximum disparity value between adjacent views of the multiple views.

5. The method of claim 4, wherein the predetermined maximum disparity value is based on one of:
a selected eye distance value and a safety margin, and
a user defined maximum disparity value.

6. The method of claim 1 wherein the overlay comprises at least one of subtitles, closed caption information, user interface information, and a further input three dimensional input signal.

7. The method of claim 1, wherein adapting the input three dimensional video signal comprises one of:
cropping the at least one view on one side, so as to obtain an altered disparity range when said cropped view is combined with another one of the views,
cropping the at least one view on one side and extending the at least one cropped view on a side opposite to the one side, so as to obtain an altered disparity range when said extended cropped view is combined with another one of the views, and
cropping the at least one view and scaling it back to full width, so as to obtain an altered disparity range when said extended scaled cropped view is combined with another one scaled cropped view.

8. The method of claim 1 further comprises embedding metadata in the shifted three dimensional video signal indicative of the far and near disparity of the shifted three dimensional video signal.

9. The method of claim 2 further comprises embedding metadata in the shifted three dimensional video signal comprising the overlay indicative of the far and near disparity of the shifted three dimensional video signal comprising the overlay.

10. A non-transitory computer readable medium, comprising program instructions, which when executed by processing circuitry, cause the performance of:
determining a far disparity estimate indicative of the largest disparity value for the input three dimensional video signal, and determining a near disparity estimate indicative of the smallest disparity value for a spatial region within the input three dimensional video signal,
adapting the input three dimensional video signal by shifting a disparity range of the input three dimensional video signal backwards away from the viewer by means of a disparity shift based on the far disparity estimate in order to produce an overlay safe area that is located substantially in front of scene content in the spatial region of the input three dimensional video signal, and
generating an overlay in said overlay safe area within the spatial region for the shifted three dimensional video signal based on the near disparity estimate and the disparity shift, wherein said overlay safe area includes positions at or near a zero disparity plane of the input three dimensional video signal as displayed.

11. A system for processing an input three dimensional video signal comprising multiple views, the system comprising:
a disparity determinator for determining
a far disparity estimate indicative of the largest disparity value for the input three dimensional video signal and
a near disparity estimate indicative of the smallest disparity value for a spatial region within the input three dimensional video signal,
a disparity shifter arranged for adapting the input three dimensional video signal by shifting a disparity range of the input three dimensional video signal backwards away from the viewer by means of a disparity shift based on the far disparity estimate in order to produce an overlay safe area that is located substantially in front of scene content in the spatial region of the input three dimensional video signal,
an overlay generator arranged to generate an overlay within said overlay safe area for the shifted three dimensional video signal based on the near disparity estimate and the disparity shift, wherein said overlay safe area includes positions at or near a zero disparity plane of the input three dimensional video signal as displayed.

12. The system of claim 11 further comprising a video mixer arranged to overlay the overlay over the shifted three dimensional video signal.

13. The system of claim 11, wherein the disparity estimator is arranged to determine the far disparity estimate and the near disparity estimate on one of a per shot basis and per group of shots basis.

14. The system of claim 11, wherein the disparity shift is based on a predetermined maximum disparity value between adjacent views of the multiple views.

* * * * *